(12) United States Patent
Shaver et al.

(10) Patent No.: US 8,972,631 B2
(45) Date of Patent: Mar. 3, 2015

(54) DATA ACCESS FORMATTER

(71) Applicant: Seagate Technology LLC, Cupertino, CA (US)

(72) Inventors: Jimmie Ray Shaver, Yukon, OK (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 46 days.

(21) Appl. No.: 13/843,388

(22) Filed: Mar. 15, 2013

(65) Prior Publication Data

US 2014/0281061 A1 Sep. 18, 2014

(51) Int. Cl.
  *G06F 3/00* (2006.01)
  *G06F 3/06* (2006.01)
  *G06F 13/16* (2006.01)
  *G06F 5/00* (2006.01)

(52) U.S. Cl.
  CPC .................................. *G06F 13/1689* (2013.01)
  USPC ............ 710/58; 710/2; 710/5; 710/8; 710/11; 710/14

(58) Field of Classification Search
  None
  See application file for complete search history.

(56) References Cited

U.S. PATENT DOCUMENTS

| | | | |
|---|---|---|---|
| 6,594,096 B2 | 7/2003 | Burns et al. | |
| 6,611,391 B1 | 8/2003 | Murphy et al. | |
| 7,679,852 B2 | 3/2010 | Shaver et al. | |
| 7,969,676 B2 | 6/2011 | Buch et al. | |
| 8,085,486 B2 | 12/2011 | Lam | |
| 2010/0118428 A1 | 5/2010 | Buch et al. | |
| 2010/0118429 A1 | 5/2010 | Vikramaditya et al. | |
| 2010/0161917 A1 | 6/2010 | Reddy | |
| 2011/0087721 A1* | 4/2011 | Huang et al. | 709/201 |
| 2012/0082015 A1 | 4/2012 | Grobis et al. | |
| 2012/0278537 A1* | 11/2012 | Lee | 711/103 |

* cited by examiner

*Primary Examiner* — Scott Sun
(74) *Attorney, Agent, or Firm* — HolzerIPLaw, PC

(57) ABSTRACT

The defined architecture allows for format-efficient data storage on bit-patterned media, while allowing for typical variations in the drive, such as reader to writer gap variations. The defined BPM architecture relaxes some timing requirements on real-time signaling from the formatter to the channel, while enabling bit-accurate alignment between data accesses and the media.

25 Claims, 11 Drawing Sheets

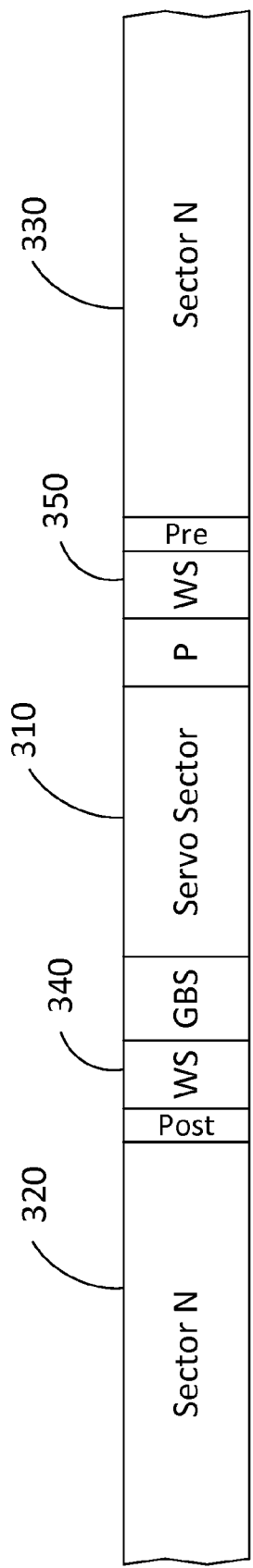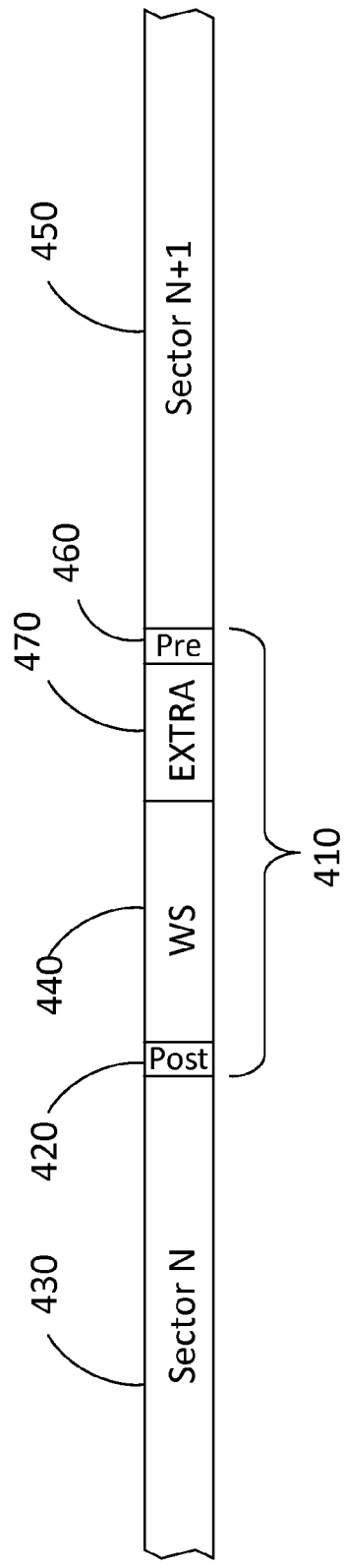
FIG. 3
FIG. 4

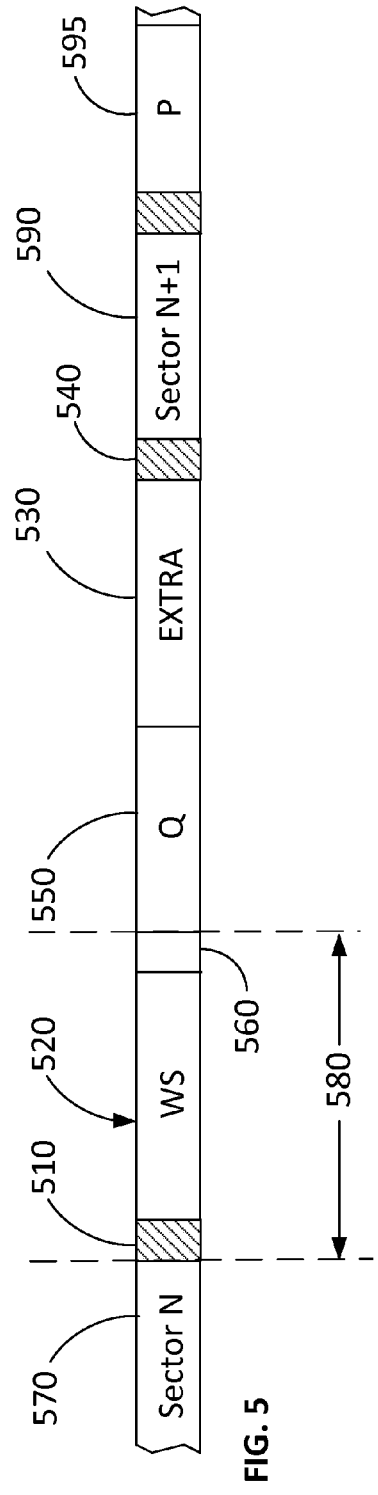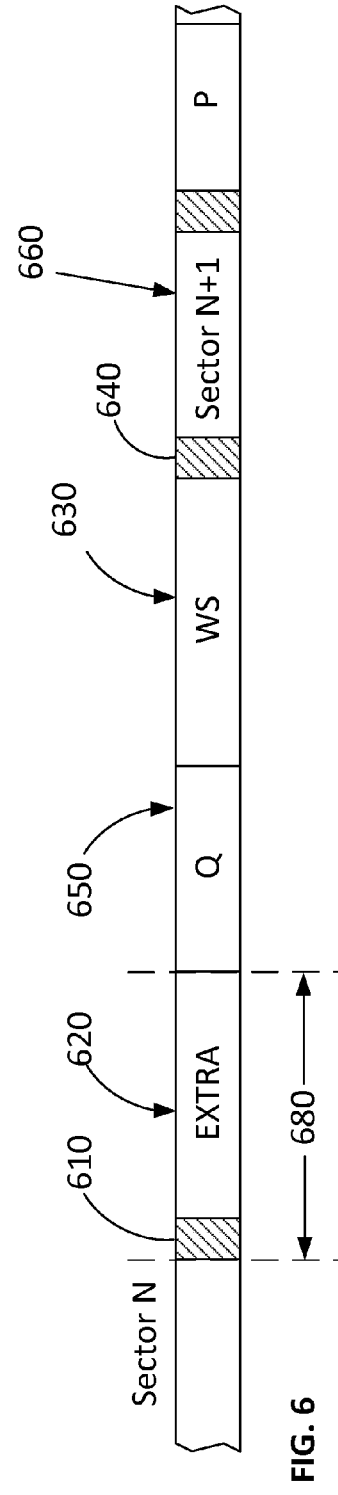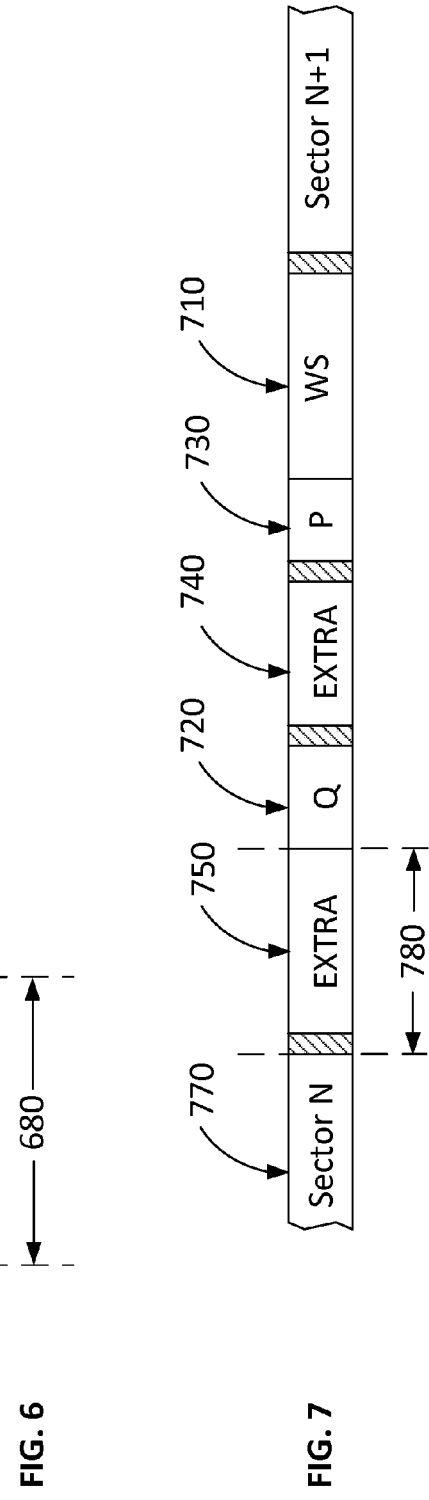

| Fragment Descriptor | Sector Frag Start WS | Sector Frag End WS | Sector Frag Start | Sector Frag Length | Sector Frag Number | End of Sector Flag |
|---|---|---|---|---|---|---|
| N | 4 | 78 | 11 | 52 | 2 | 1 |
| N+1 | 78 | 185 | 91 | 62 | 0 | 1 |
| N+2 | 185 | 215 | 192 | 20 | 0 | 0 |

DATA ACCESS FORMATTER

SUMMARY

The detailed description describes a data format. A formatter provides data access information and a signal to indicate the data access information is ready for transfer. The signal, however, may not be used to initiate a data access. For example, a channel may use the signal to latch the data access information, but may use its own internally generated signal, which can be independently derived instead of using the signal, to initiate the data access. Also disclosed is a data formatting method comprising outputting a fragment descriptor for a data access and outputting a signal that indicates the fragment descriptor is available and that is timed independent of a start of the data access.

BRIEF DESCRIPTION OF THE DRAWINGS

FIG. 1b is a block diagram of components shown in FIG. 1a;

FIG. 3 illustrates two data wedges split by a servo wedge;

FIG. 4 illustrates an intersector gap between two data sectors;

FIGS. 5-7 illustrate intersector gap interleaving with Q and/or P fields;

DETAILED DESCRIPTION

Figure 1A:
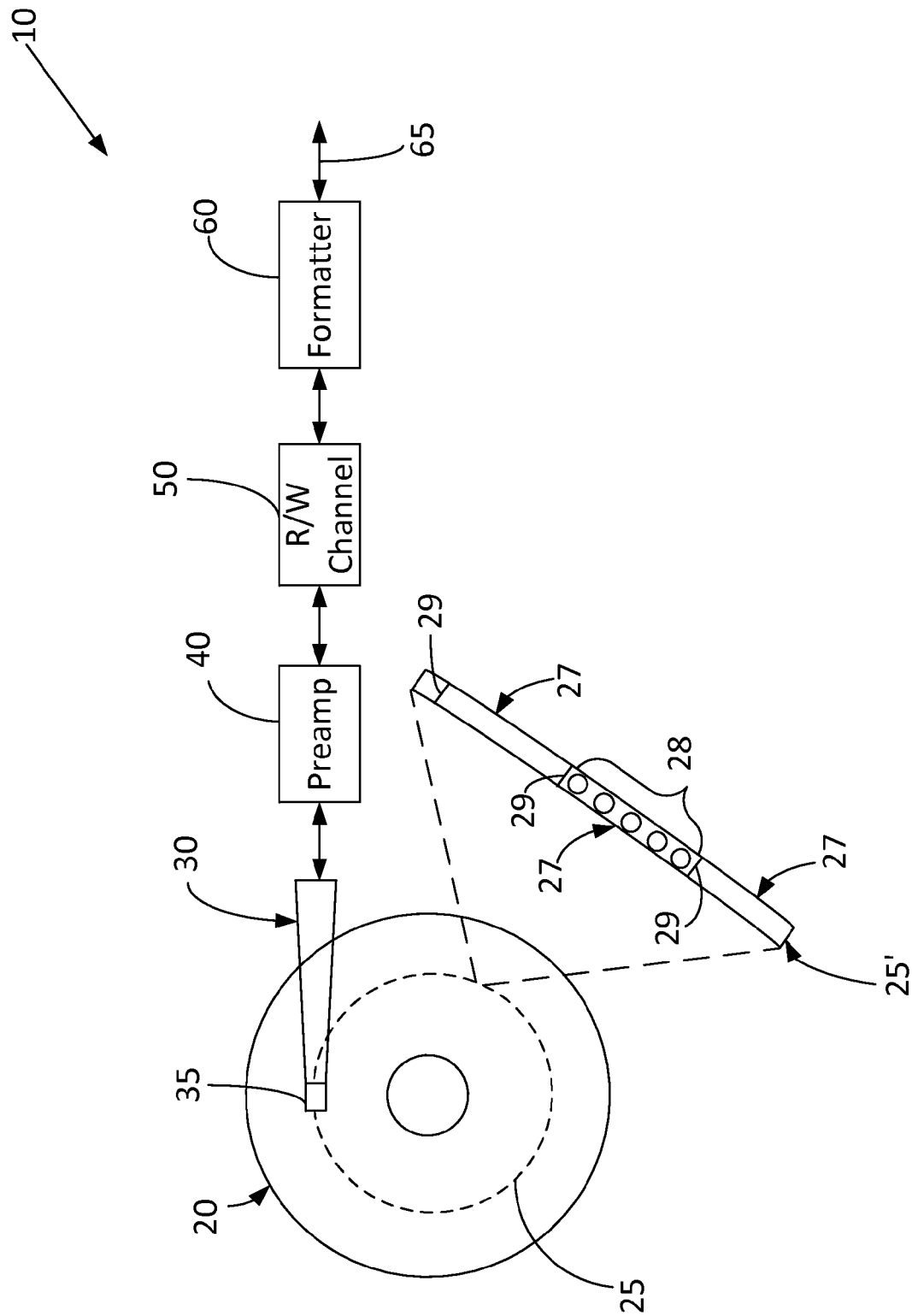
FIG. 1a illustrates a device that uses bit-patterned media.

The capacity of a storage device, such as a disc drive, can be increased by using bit-patterned media (BPM). Such a disc drive is shown in FIG. 1a. Disc drive 10 includes BPM 20 that stores data on tracks, one shown as track 25. In some embodiments BPM 20 may also be a heat assisted magnetic recording medium that includes features to enable that technology. Data on track 25 is accessed by a transducing head 35 on an actuator arm 30, a preamplifier 40, a channel 50 and a formatter 60.

BPM 20 is constructed with isolated areas (referred to as "dots" or "islands") of the magnetic material of BPM 20, each dot intended to contain one bit of data or more than one bit of data in a multilevel embodiment. To illustrate, track portion 25' is shown that includes data wedges 27 and servo sectors 29. Data wedges 27 include dots 28 that are used for storing data and overhead information. Each dot is separated from its adjacent dots by regions of non-magnetic material. There can be thousands, millions or more of dots for each data wedge.

Servo fields 29 are used by components of disc drive 10 to obtain position information such as the number of the track that transducing head 35 is tracking, the circumferential position of transducing head 35 relative to that track, fine positioning information that is used to keep transducing head 35 on that track, etc.

To write data to BPM 20, formatter 60 receives data on bus 65. The data can be from a system or host using disc drive 10, or can originate from within disc drive 10. Formatter 60 formats the data for each data wedge 27, then sends the formatted data to channel 50. Channel 50 encodes the formatted data for storage on BPM 20. In the meantime, channel 50 is also synchronized with the dots on a BPM track so that channel 50 can timely provide the encoded, formatted data to preamplifier 40. Preamplifier 40 transmits the signal representing the encoded, formatted data to transducing head 35. A writer (not shown) of transducing head 35 then interacts with a BPM track to write the encoded, formatted data. Reading of data from a BPM track is processed in reverse of the manner described.

Figure 1B:
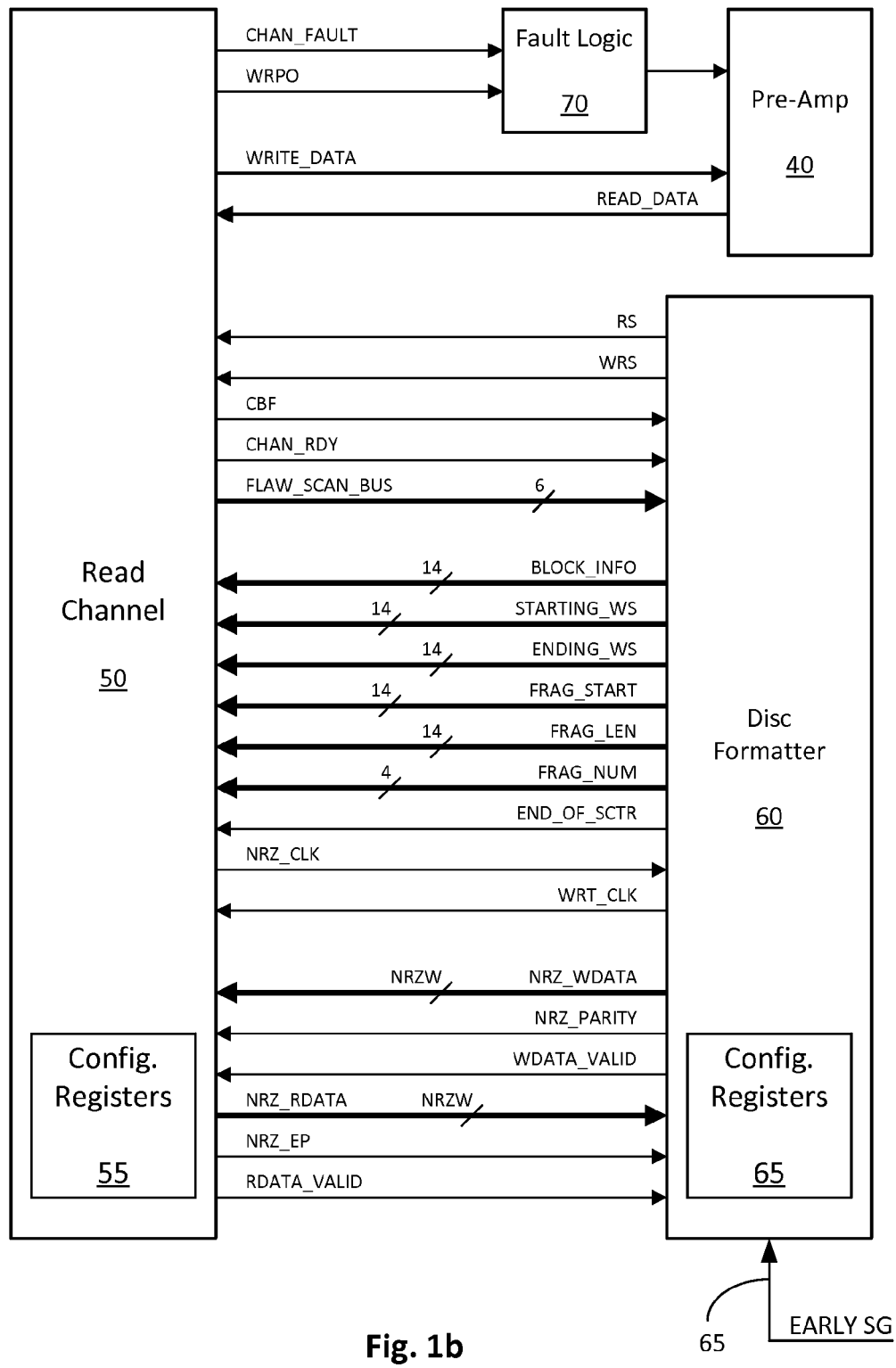

FIG. 1b shows the interaction of preamplifier 40, channel 50 and formatter 60 in more detail. The interface protocol between channel 50 and formatter 60 contributes to the use of the disc drive of the BPM and the data format explained immediately below. The general interface between channel 50 and formatter 60 includes a clock interface that includes NRZ_CLK and WRT_CLK, and a control interface that includes RS, WRS, STARTING_WS, ENDING_WS, FRAG_START, FRAG_LEN, FRAG_NUM, END_OF_SCTR and BLOCK_INFO. The general interface also includes a data interface that includes NRZ_RDATA, NRZ_EP, RDATA_VALID, NRZ_WDATA, NRZ_PARITY, WDATA_VALID, CBF, CHAN_RDY, and FLAW_SCAN_BUS. More details of this general interface will be provided later in this description. Data is passed between preamplifier 40 and channel 50 on READ_DATA and WRITE-DATA bus.

BPM 20 also contains embedded timing burst patterns (not shown) that are formatted into the dots 28 of data wedges 27 at preferred regular timing intervals. These embedded timing burst patterns are referred to as iPLL (interspersed phase-locked loop) fields or "P fields." The P fields can have a different physical dot pattern than the dots for the remaining part of the data wedge. Circuitry in the disc drive, particularly channel 50, uses the P fields to obtain phase and frequency clock synchronization with the dots 28 on BPM 20. The timing interval between the P fields is based on a magnitude and a bandwidth of tolerable timing disturbances between channel 50 and BPM 20. Specifically, the frequency tolerance and interval between P fields is chosen to ensure that under sustained operating conditions an accumulated phase error stays limits for reliable writing.

Figure 2A:
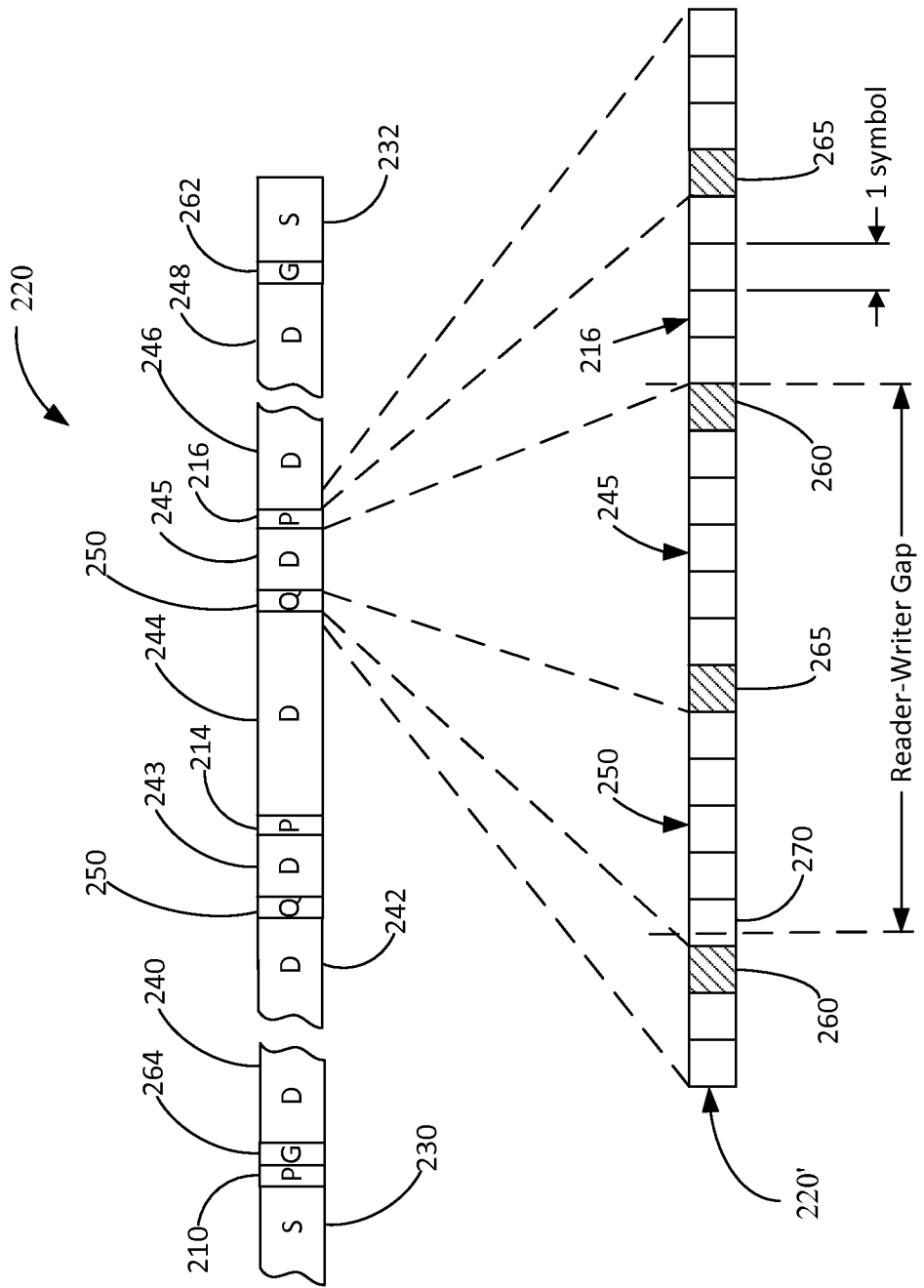
FIGS. 2a and 2b illustrate a data format for a data wedge.

FIG. 2a shows a single BPM data wedge between two servo fields containing multiple P fields. P fields 210, 214, 216 break data wedge 220 between servo fields 30, 32 into multiple data regions 240, 242, 243, 244, 245, 246, 248. During write operations the P fields 210, 214, 216 are read to obtain timing phase information to feed back into the data phase-locked loop (PLL) of the channel. While the reader (not shown) of the transducing head is reading the P fields 210, 214, 216, the writer is "quiet." The writer is either not energized or writing a DC field to avoid inducing noise into the reader or read signal. To facilitate this, quiet fields 50, or "Q fields," are formatted onto the media prior to each P field 214, 216 since the writer trails the reader in the transducing head. The precise location of each Q field 50 relative to its associated P field can vary from head to head and from track to track due to the variations in the effective reader-writer gap. Since no data is written in the date wedge 220 prior to P field 210, no associated Q field is used. Additionally, the data sector fragments 243, 245 between the Q and P fields are referred to as a "runt data sector fragments."

The placement and length of each Q field can be determined during manufacturing and saved for each track and potentially each zone. During that time all the transducing heads of a disc drive are characterized, particularly the reader-writer gap for each transducing head and each zone of each surface of each BPM in the disc drive. A zone can consist of multiple tracks that have characteristics similar enough that they can all be treated the same for purposes of accessing data stored on them. For example, a zone can have multiple tracks that have the same format and the same data frequency.

Figure 2B:
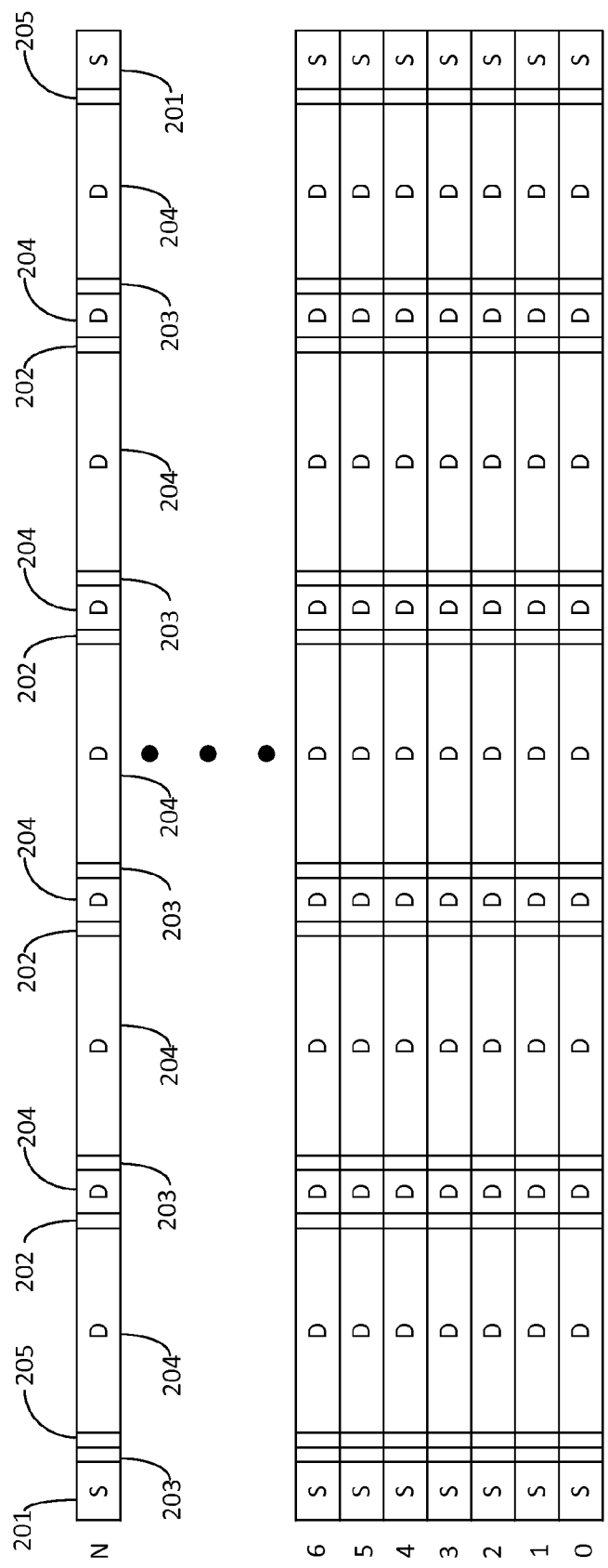

FIG. 2b illustrates a zone that includes radially-aligned data wedges of tracks 0-N. Servo sectors 201 bound Q and P fields 202, 203, data sector fragments 204, and gaps 205 before and after the servo sectors. As shown, Q and P fields are radially aligned. The Q and P fields can be individually and collectively considered as "transducing head overhead."

Tracks 0-N constitute a zone of the BPM. As such, tracks 0-N have similar characteristics so that the disc drive firmware can easily control access to them. For example, the data wedges have the same number of dots between servo sectors 201.

Turning back to FIG. 2a, illustrated is a larger scale data wedge portion 220' of the data wedge 220 showing the relative positions for Q field 250 and P field 216. Data wedge portion 220' is composed of several defined areas on the media called "symbols" that are shown as squares in data wedge portion 220'. Each symbol is 12 bits (dots) long, for example.

P fields are preferably aligned to symbol boundaries, and can include pad bits in the beginning and/or end symbols to facilitate the symbol alignment. P fields can also include a synchronization pattern. Preferably Q field 250 is sized at least one symbol larger than its associated P field 216 since the reader-writer gap may not be an integer number of symbols. To illustrate, the reader-writer gap is shown to extend from the first symbol of P field 216, back to symbol 270 immediately after postamble 260. Since P field 216 is 4 symbols long, Q field 250 includes symbol 270 and the immediately following four symbols. Also, the effective reader-writer gap varies with the transducing head skew angle, so the position of the Q field relative to the P field is dependent on the radial position of the data track within the zone. The size of the Q fields is preferred constant across such zone, or at least on the same track.

The disc drive firmware determines the size of the runt data sector fragment 245 between Q field 250 and P field 216, based on the reader-writer gap of the corresponding transducing head at the corresponding data track. In FIG. 2a the number of symbols between the beginnings of the Q and P fields is 12, so 12 minus the 5 symbols of Q field 250 leaves 7 symbols for runt data sector fragment 245, including preamble 265 and postamble 260.

Preamble and postamble fields 265, 260 shown in FIG. 2a preferably are used immediately before and after every area of contiguous data to support the decoder function in the channel that recovers the actual bits from the encoded bits on the BPM. These fields preferably are one symbol each. The preamble and postamble fields do not have to be the same size, but each are the same size for the entire track and potentially a zone.

Due to the unipolar nature of the P field media pattern (e.g., ++00) the signal read from the P field may not be sufficient to serve as valid preamble or postamble data for the decoder of the channel. Therefore, a postamble field is used before every P field, and a preamble field is used after every P field for the decoder. Since the Q field is written as a DC pattern over data-patterned media, it has different read-back characteristics than the P field, and the Q field may not have to use a postamble field or a preamble field. However, as shown in FIG. 2a, the preamble and postamble fields 265, 260 are used around both P and Q fields, and they are each one symbol long. Each preamble and postamble, if used, associated with respective Q and P fields is also part of the transducing head overhead.

During read operations the channel skips the Q fields 50 and reads the P fields 210, 214, 216 of data wedge 220 to maintain the channel PLL synchronization with the BPM. Even if some of the sectors are being skipped (for example, they are not part of the requested block transfer), the channel still reads and demodulates the P fields. Note that a gap before servo 262 compensates for the reader-writer gap and write-to-read recovery time when switching from writing data to reading servo data. A gap after servo 264 may be used to support servo-recovery to data-recovery switching time and for recording special data fields, such as repeating run-out and repeating timing run-out fields, if needed.

Referring to FIG. 3, a data sector is shown that is split on a track by a servo sector. Servo sector 310 is interposed to a data sector fragment 320 and a data sector fragment 330 of data sector N. In the case where servo sector 310 contains bipolar (e.g., ++−−) data fields such as a repeatable run-out compensation field, the preamplifier should be turned off while the transducing head is over servo sector 310. In that case, write splice (WS) 340 is placed at the end of the data sector fragment 320 to accommodate the time the preamplifier takes to turn off its write current. Write splice (WS) 350 also is placed at the beginning of the data sector fragment 330 to accommodate the time the preamplifier takes to turn on the write current. The size or length (or duration) of a write splice represents a current transient in the writer circuit that would interfere with any read operation, such as recovering a P field. In addition, preamplifiers can produce a high-frequency "degaussing" burst to the writer shortly after switching out of write mode. That degaussing is also taken into account in determining the WS duration. If servo sector 310 does not have bipolar data fields, the preamplifier can be left on while the transducing head is over servo sector 310. With this configuration WS 340, 350 can be eliminated, and a more efficient track format is had.

In addition, preferably a preamble field is placed at the beginning of every data sector fragment after a write splice (as shown in FIG. 3, for example) if the write splice exists at the beginning of the fragment. Similarly, a postamble field is placed at the end of every data sector fragment before a write splice if the write splice exists at the end of the fragment. Regardless of where they are used in the data wedge, each preamble is the same symbol length and each postamble is the same symbol length. The same is true for the entire track and potentially the zone.

To support random access of the data on the BPM, in which any single sector on the media can be read or written individually, the data format includes intersector gaps (ISGs) between sequential data sectors. Referring to FIG. 4, an ISG 410 includes a postamble field 420 immediately at the end of data sector fragment 430, a write splice (WS) field 440 shared by both data sector fragments 430, 450 for optimum format efficiency, and a preamble field 460 immediately preceding data sector fragment 450. ISG 410 also includes a predetermined number of extra symbols 470 to accommodate P and Q field interruptions of the ISG 410, in which cases the position of the WS 440 may have to move later than its preferred earlier position. As an example, ISG 410 can be thirteen symbols wide with postamble 420 and preamble 460 being one symbol each, WS 440 being seven symbols, and extra symbols 470 being four symbols. FIG. 4 represents an ISG that occurs in a portion of a data wedge away from any Q or P field.

If only data sector fragment 430 is written, the channel turns off the preamplifier write current at the beginning of WS 440. If only data sector fragment 450 is written, the channel turns on the preamplifier write current at the beginning of WS 440. If both data sector fragments are written back-to-back, the write current remains on during the entire ISG.

When the data wedge format produces an ISG that is interrupted by a Q or P field, the formatter determines the correct location of the write splice. In FIG. 5, the ISG is thirteen symbols long and includes postamble 510 (one symbol), WS 520 (seven symbols) that includes symbol 560 (explained below), extra symbols 530 (four symbols) and preamble 540 (one symbol). The ISG is interrupted by Q field 550. The number of symbols 580 between the end of data sector fragment 570 and the beginning of Q field 550 is eight. The formatter determines that there is enough symbol area between the end of data sector fragment 570 and Q field 550 for WS 520 to be placed before Q field 550 along with postamble 510. Note here that WS 520 is allowed to use the symbol area 560 reserved for the postamble immediately before the Q field because the ISG already includes postamble 510 for data sector fragment 570. Thus there is no need to use symbol area 560 for a postamble immediately before Q field 550.

Extra symbols 530 and preamble 540 start immediately after Q field 550 in the runt data sector fragment between Q and P fields 550, 595. Extra symbols 530 start in the symbol immediately after the Q field that is reserved for the preamble. Since the ISG already includes preamble 540 for data sector fragment 590, the reserved preamble symbol does not have to be used as such.

In FIG. 6, an ISG (including postamble 610, extras symbols 620, WS 630 and preamble 640) occurs in the track layout one symbol later than in FIG. 5, and is interrupted by Q field 650. Here, the formatter determines that there is not enough room to place the 7-symbol WS 630 and the 1-symbol postamble 610 before Q field 650 since the number of symbols 680 is seven, so WS 630 is instead placed immediately after Q field 650 starting in the symbol that is reserved for the preamble. Extra symbols 620 are placed before Q field 650. As the ISG already includes preamble 640 for data sector fragment 660, the reserved preamble symbol immediately after Q field 650 does not have to be used as such. Likewise, extra symbols 620 use the reserved postamble before Q field 650 since the ISG already includes postamble 610.

Depending on at least one of the lengths of the P fields, the Q fields, the write splice, the effective reader-writer gap, and the linear bit density of the media, the write splice may be too large to fit in the runt data sector fragment between the Q and the P fields. In this case, the ISG is sized so that there is room for a write splice field either before the Q field or after the P field when an ISG is interrupted by both a Q field and a P field. This is shown in FIG. 7. WS 710 is ten symbols long and the runt data sector fragment between the Q and P fields 720, 730 is 9 symbols long. As shown, the extras symbols 740 are placed in the runt data sector fragment. Furthermore, the symbol length 780 between the end of data sector fragment 770 and the beginning of Q field 720 is ten—too small for the eleven symbols of WS 710 and the postamble. WS 710 is then placed after the P field 730. The ISG length of thirty symbols (nine symbols each in extra symbols 740, 750, the 1-symbol each preamble and postamble, and WS 710) guarantees that the write splice will always fit either before the Q field or after the P field.

With bit-patterned media, careful consideration must be given to the placement of write splices on the media near Q fields and P fields. Again, the duration of the write splice represents a current transient in the writer circuit that would interfere with any read operation, such as recovering a P field. In addition, preamplifiers can produce a high-frequency "degaussing" burst to the writer shortly after switching out of write mode. These degaussing bursts and current transients in the writer are preferred not to overlap any Q, P or servo field on the media since these fields should maintain their default "DC" magnetization state. Therefore, "invalid write splice" regions are defined by the formatter to prevent any portion of a write splice from overlapping a Q or P field. Protection of the servo fields is achieved automatically by the track layout and the gaps before and after servo without the need for additional functionality in the formatter.

Note that by calculating a single ISG size that works for every ISG location around each data track of a zone, and taking into account the fixed symbol length of the Q and P fields, postambles, preambles and other overhead, the formatter ensures that all data tracks within a recording zone have the same physical track layout and the same sector capacity. This is so regardless of how the runt data sector fragment size between Q and P fields varies with a transducing head skew angle and the linear bit density, and regardless of any particular transducing head reader-writer gap size. This small tradeoff in format efficiency allows for significant reductions in firmware and manufacturing complexity.

Figure 8:
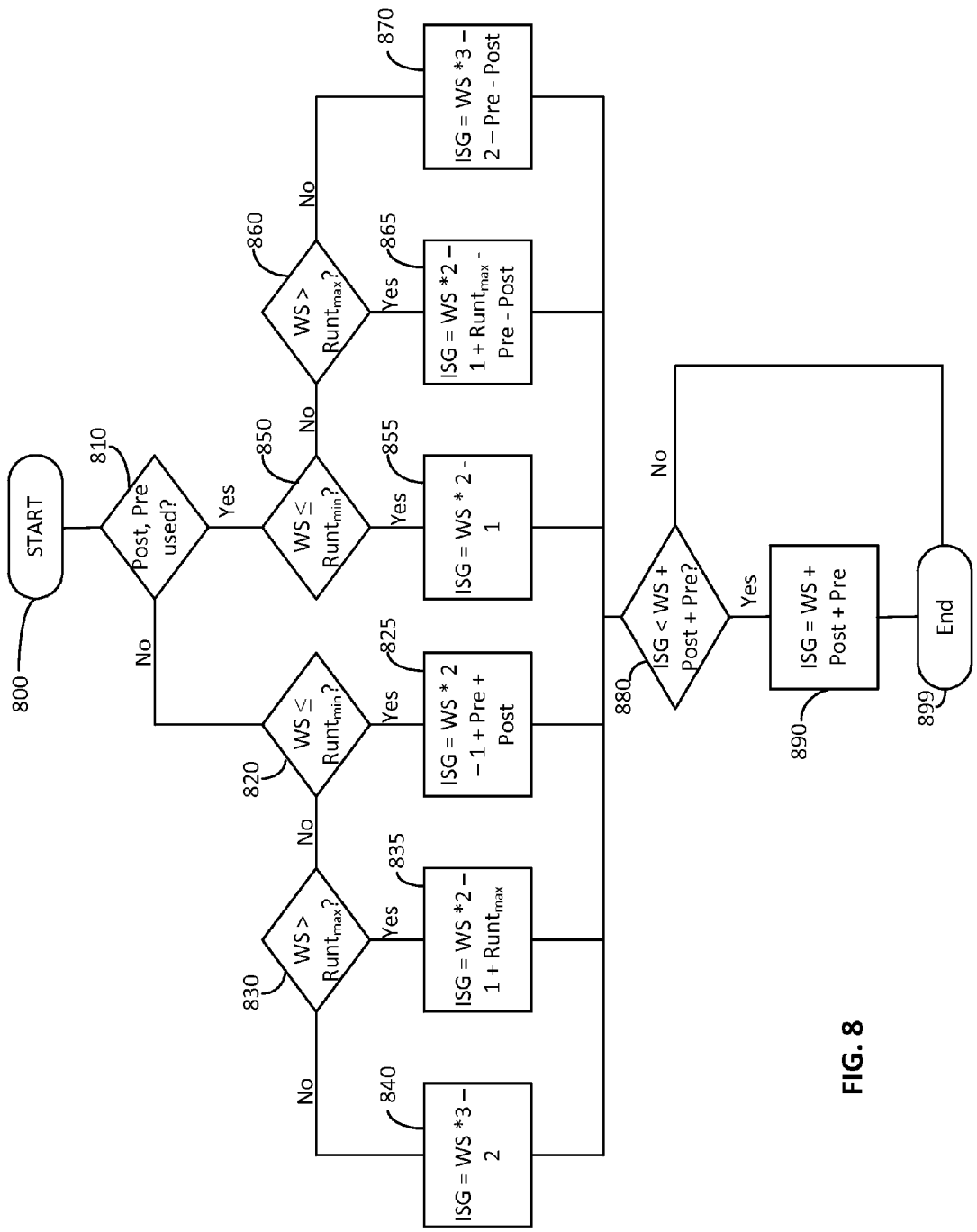
FIG. 8 is a flowchart of a calculation for an intersector gap.

A method for calculating the symbol length of the ISG is shown in FIG. 8. The method considers whether postamble and preamble fields are used around the Q fields. Also, the minimum and maximum runt data sector fragment symbol lengths $Runt_{min}$, $Runt_{max}$ between the Q and P fields for the corresponding recording zone have been pre-calculated, as has the worst-case write splice symbol length. Here note that the symbol length of the runt data sector fragment may vary in a zone because the reader-writer gap may vary due to head skew changes over that zone. If the reader-writer gap increases so as to encroach upon the symbol preceding the Q field, that symbol will be included in the Q field. But the symbol at the other end of the Q field will be added to the adjacent runt data sector fragment. The result is that the Q fields stay the same length as well as the total number of symbols in the data sector fragments. To further explain this result, consider FIG. 2b where the Q fields 202 would be shifted one symbol earlier in the data wedge of track N. Then the adjacent runt data sector fragment length would increase by one symbol. In this case track N can still be included in the zone with the other tracks shown.

Returning to FIG. 8, the method starts at step 800, then proceeds to step 810 to determine if postambles and preambles are used around the Q fields. If no, the method proceeds to step 820 to determine if the WS symbol length is less than or equal to $Runt_{min}$. If yes, the method proceeds to step 825 where the intersector gap symbol length is set equal to the write splice symbol length times 2, then minus 1 plus the preamble and postamble symbol lengths. If no, the method proceeds to step 830 to determine if the WS symbol length is greater than $Runt_{max}$. If yes, the method proceeds to step 835 where the intersector gap symbol length is set equal to the write splice symbol length times 2, then minus 1 plus $Runt_{max}$. If no, the method proceeds to step 840 where the intersector gap symbol length is set equal to the write splice symbol length times 3, then minus 2.

Returning to step 810, if postambles and preambles are used around the Q fields, the method proceeds to step 850 to determine if the WS symbol length is less than or equal to $Runt_{min}$. If yes, the method proceeds to step 855 where the intersector gap symbol length is set equal to the write splice symbol length times 2, then minus 1. If no, the method proceeds to step 860 to determine if the WS symbol length is greater than Runt$_{max}$. If yes, the method proceeds to step 865 where the intersector gap symbol length is set equal to the write splice symbol length times 2, then minus 1 plus Runt$_{max}$ minus the preamble and postamble symbol lengths. If no, the method proceeds to step 870 where the intersector gap symbol length is set equal to the write splice symbol length times 3, then minus 2 minus the preamble and postamble symbol lengths.

From steps 825, 835, 840, 855, 865 and 870 the method proceeds to step 880 to determine if the intersector gap symbol length is less than the write splice symbol length plus the preamble and postamble symbol lengths. If yes, the method proceeds to step 890 where the intersector gap symbol length is set equal to the write splice symbol length plus the preamble and postamble symbol lengths. Then the method terminates at step 899. If no, the method terminates at step 899.

Alternatively, the BPM formatter could be designed to lay out smaller ISGs where they are not interrupted by a Q or P field, and larger ISGs where interruptions require the write splice to be shifted to a later media position. Refer to FIG. 7 that shows a larger ISG than the ISG in FIG. 4. However, with this approach, track layouts and capacities will vary within a recording zone, from head to head, and from drive to drive. This adds to the complexity of the disc drive firmware.

Referring back to FIG. 1b, disc formatter 60 models the BPM with symbol resolution, where a symbol can be defined as a unit of data transferred between formatter 60 and read channel 50 in one clock cycle. A symbol size can be 12 bits. All fields in the data wedges between servo fields preferably are defined in terms of integer numbers of symbols. These fields include Q fields, P fields, the gaps before and after the servo fields, data sector fragments, intersector gap fields, write splice fields, preamble fields and postamble fields.

The interface between formatter 60 and channel 50 uses a preferred Long-Latency Interface (LLI) protocol. An LLI protocol allows this interface to have a different transfer rate than the interface between channel 50 and the BPM. The LLI also supports the data sector fragment descriptor flow (explained below) from formatter 60 to the channel 50.

The general interface between channel 50 and formatter 60 includes a clock interface that includes NRZ_CLK and WRT_CLK, and a control interface that includes RS, WRS, STARTING_WS, ENDING_WS, FRAG_START, FRAG_LEN, FRAG_NUM, END_OF_SCTR and BLOCK_INFO. The general interface also includes a data interface that includes NRZ_RDATA, NRZ_EP, RDATA_VALID, NRZ_WDATA, NRZ_PARITY, WDATA_VALID, CBF, CHAN_RDY, and FLAW_SCAN_BUS. The control interface is driven by formatter 60 and controls the real-time, access functions relative to the BPM. The data interface is bidirectional and controls the movement of data between channel 50 and formatter 60. Signals sent from channel 50 to formatter 60 are synchronous to the NRZ_CLK from channel 50. Signals sent from formatter 60 to channel 50 are synchronous to the WRT_CLK from formatter 60.

NRZ data symbols transferred across the NRZ_RDATA and NRZ_WDATA buses are each one symbol wide. Media data symbols transferred to and from the BPM contain channel-encoded data and have the same number of bits as the NRZ_RDATA bus. Since some media data symbols include parity bits (and in some cases may include pad bits or other overhead) generated by channel 50, there are more media data symbols in a sector stored on the media than there are NRZ data symbols in a sector transferred on the data interface between formatter 60 and channel 50. Thus the data sector size transferred across the general interface ("NRZ sector size") is not the same size as the data sector saved on the media ("media sector size").

NRZ_CLK from channel 50 is generated by dividing the channel 50 data PLO clock by the NRZ_RDATA bus width (NRZW). The formatter uses the NRZ_CLK to count the data wedge symbols and maintain synchronization to the disc media. When the formatter counts a number of NRZ_CLK cycles, it knows that number represents the number of 12-bit media symbols that have passed the transducing head during that same time (regardless of what information is or is not stored in those media symbols). Preferably, then, the read channel does not "stretch" the NRZ_CLK or change the phase of the NRZ_CLK in any way during the data wedge to compensate for the difference in NRZ and media sector sizes. Because of that, channel 50 and formatter 60 are programmed to know both the NRZ sector size (in NRZ data symbols) and the media sector size (in media data symbols).

For each data sector fragment on the media, formatter 60 calculates the data wedge format and transfers an information packet to the channel 50. The information packet provides data access information to the channel such as the amount of data to be accessed, data identification and/or overhead information. For the following description, the information packet will be exemplified as a "fragment descriptor." Each fragment descriptor preferably transfers six parameters in one or a predetermined small number of consecutive WRT_CLK cycles, beginning at the assertion of a read signal (RS) or a write signal (WRS). The following six parameters are included in the fragment descriptor: Sector Fragment Starting Write Splice, Sector Fragment Ending Write Splice, Sector Fragment Start, Sector Fragment Length, Sector Fragment Number, and End Of Sector flag.

Note that for the fragment descriptors, the term "sector fragment" is different from the term "data sector fragment" used to this point. A sector fragment can include multiple data sector fragments. Sector Fragment Starting Write Splice specifies where the write splice begins at the start of a sector fragment. Sector Fragment Ending Write Splice specifies where the write splice begins at the end of the sector fragment. Sector Fragment Start specifies where the sector fragment's starting preamble field begins. Sector Fragment Length specifies the number of symbols in the sector fragment. The Sector Fragment Number refers to the sector fragment number within the sector fragment's corresponding sector and is included in the interface to help ensure data sequence synchronization between formatter 60 and channel 50. The first sector fragment of any sector is defined as sector fragment 0. The End Of Sector flag is asserted for the last sector fragment of every sector, giving channel 50 advance notice that the corresponding sector fragment will complete the sector or otherwise generate a fault within channel 50.

The values for Sector Fragment Starting Write Splice, Sector Fragment Ending Write Splice and Sector Fragment Start refer to the corresponding symbol position measured from the beginning of the data wedge and counted up from zero. For this purpose, the beginning of the data wedge—"symbol zero"—is the first symbol of the first P field after the servo field. In each data wedge, data is not stored on the media prior to the first P field.

For read channels that are capable of writing (a specified polarity of DC pattern) through the servo field for a split sector, the first sector fragment of the data wedge might not have a starting write splice, and the last sector fragment of the data wedge might not have an ending write splice. (For large sector sizes, the starting sector fragment and ending sector fragment in a data wedge might be the same fragment.) If a write splice does not exist, the corresponding parameter (Sector Fragment Starting Write Splice or Sector Fragment Ending Write Splice) is set to a special value such as all ones. This special value tells channel 50 that no write splice exists there on the media.

The Sector Fragment Length parameter specifies the exact number of data symbols that will be accessed in the corresponding data sector fragment. This number does not include any overhead such as write splice fields, preamble or postamble fields, gaps before and after servo, and the extra symbols within the Intersector Gap (ISG) area. Only data symbols are included in the Sector Fragment Length parameters, and all sector fragments of a given sector sum to the media sector size that is a constant value for a given track.

Prior to accessing data on the BPM, channel 50 and formatter are programmed with overhead information for the desired track. This programmed information may also be used in whole or in part for a zone that the track belongs. The overhead information includes whether preambles and postambles are used, the symbol size of the preambles, postambles, WS, Q field, P field, runt data sector fragment, the location of the Q fields, and the NRZ and media sector symbol sizes. This information is programmed by the disc drive controller firmware into configuration registers 55, 65 shown in FIG. 1b. Preferably only one media sector size and one NRZ sector size will be supported during any read or write operation.

In read mode the channel 50 PLO remains locked to the media bit pattern, relative to the transducing read head. Also, channel 50 maintains a count of the symbols in each data wedge, starting with symbol zero (at the beginning of the first P field in the data wedge). When channel 50 is ready to begin reading a sector from the media, it asserts CHAN_RDY to formatter 60. Formatter 60 waits for the beginning of the target sector to approach the transducing head, and then formatter 60 asserts RS to channel 50, if CHAN_RDY is asserted. Formatter 60 guarantees a minimum number of WRT_CLK cycles, for example 10 between RS assertion and the beginning of the corresponding sector or sector fragment on the media, with respect to the transducing head. This minimum number of cycles provides channel 50 enough time to decode the fragment descriptor sent at the rising edge of RS and prepare to recover the sector fragment before its preamble field reaches the transducing head.

In response to the assertion of RS, channel 50 latches the fragment descriptor and waits for the FRAG_START-identified symbol to reach the transducing head. Channel 50 then begins recovering the preamble symbols (if configured for preamble fields), followed by the data symbols. At the end of the last data symbol, channel 50 recovers the postamble symbols (if configured for postamble fields). Note that if channel 50 is configured for preamble and postamble fields, a preamble field occurs immediately before the first data symbol of the sector fragment, and a postamble field occurs immediately after the last data symbol of the sector fragment, without interruptions from Q or P fields. Formatter 60, which is responsible for the media layout, controls this relationship.

During the reading of the sector fragment, channel 50 may encounter a Q field or P field, based on its internal symbol counter and its programmed Q and P field parameters. When such encounters occur, channel 50 automatically pauses its data symbol decoding before the Q field or P field, and automatically resumes its data symbol decoding after the Q field or P field. If preamble and postamble fields are enabled in channel 50 configuration registers, channel 50 also automatically pauses its data symbol decoding over preamble and postamble fields.

Channel 50 internally latches the FRAG_LEN parameter at the rising edge of the WRT_CLK cycle corresponding to the assertion of RS, so it knows how many media data symbols exist in the corresponding sector fragment. If a sector fragment ends prior to the end of the sector due to a servo field split, the split likely breaks a single sector fragment into two fragments. In this case, channel 50 pauses its decoding process while the transducing head is over the servo sector and continues decoding when more user data is read after the servo sector.

When channel 50 is ready to send decoded data to formatter 60, it asserts RDATA_VALID to formatter 60. Every NRZ_CLK cycle for which RDATA_VALID is asserted transfers one NRZ_RDATA symbol of decoded user data to formatter 60. In an optional wedge operation mode, channel 50 transfers all the data to formatter 60 contiguously for every wedge data, so the RDATA_VALID does not deassert except at the wedge boundaries. Channel 50 does not send preamble or postamble data over the NRZ_RDATA bus. As channel 50 decodes the user data from the recovered sector, it sends the decoded user data to the formatter over the NRZ_RDATA interface independently of the control interface's timing and can be delayed by a number of NRZ_CLK cycles relative to the sector location on the media.

During write operations, formatter 60 begins transferring data to channel 50 before WRS is asserted so that channel 50 has enough data queued to encode the first NRZ_WDATA symbols prior to the assertion of WRS. Subsequent encoded media data symbols are available in channel 50 at the NRZ_CLK transfer rate. Formatter 60 transfers data to channel 50 across the NRZ_WDATA bus by asserting WDATA_VALID during each WRT_CLK, as long as channel 50 does not assert the CBF (Channel Buffer Full) signal. Formatter 60 keeps channel 50's write data FIFO full enough to satisfy channel 50's data encoder at all times during the write process. When the channel 50 encoding pipeline is temporarily full, it asserts CBF to force formatter 60 to pause the data transfer. Formatter 60 does not send more data to channel 50 until CBF has been deasserted. If channel 50 detects an internal write data pipeline under-run during the write process, it alerts the formatter by asserting CHAN_FAULT. Channel 50 counts the media data symbols as it removes them from its encoding pipeline, to determine the location of the media sector boundary.

Formatter 60 waits for the target sector to approach the transducing head, and then asserts WRS to channel 50 a minimum number of WRT_CLK cycles prior to the location of the write splice reaching the write head. On the same WRT_CLK cycle for which formatter 60 asserts WRS, formatter 60 provides a fragment descriptor.

When channel 50 has encoded enough data such that it is ready to begin writing a sector to the media, it asserts CHAN_RDY to formatter 60. Formatter 60 is not allowed to begin a write-to-media operation (by asserting WRS) until CHAN_RDY has been asserted. The formatter 60 checks the state of CHAN_RDY before asserting WRS at the beginning of each sector. For split sectors, CHAN_RDY is not checked before writing sector fragments after the first sector fragment.

Further during a write operation, the formatter 60 control interface sends a fragment descriptor to channel 50 at the rising edge of WRS. STARTING_WS indicates the symbol count into the data wedge at which channel 50 is to assert write preamplifier out (WRPO) to start the write splice at the beginning of the sector fragment, unless WRPO is already asserted from writing the previous sector. If WRPO is already asserted, it will remain asserted for this sector fragment. ENDING_WS indicates the symbol count into the data wedge at which channel 50 is to deassert WRPO to start the ending write splice for the sector fragment, if the next sector is not being written. If the next sector is also being written, WRPO will remain asserted. FRAG_START indicates the symbol count into the data wedge at which the preamble field starts for the sector fragment. FRAG_LEN indicates the number of encoded data symbols in the sector fragment, excluding any preamble and postamble fields, and also excluding any Q or P field interruptions of the data on the media. FRAG_NUM indicates the fragment number, relative to the beginning of the sector (where non-split sectors will always have a fragment number of zero). END_OF_SCTR indicates whether the sector fragment ends the corresponding sector on the media. (END_OF_SCTR will always be true for non-split sectors.)

Since channel 50 begins encoding the user data in advance of the corresponding write event to the disc media, the channel 50 encoder does not know where any servo splits might occur. Therefore, channel 50 encodes data without regard to servo splits in the sectors. Similarly, the channel 50 sector encoding operation is independent of the locations of any temporary interruptions of the sector data that may occur due to Q or P fields on the media.

Again, the fragment descriptor is transferred to the channel 50 when WRS or RS is asserted, which occurs a predetermined minimum number of WRT_CLK cycles prior to the beginning of the sector fragment relative to either the read head or the write head. This number is determined by channel 50 processing delays and can be less than 10 WRT_CLK cycles for example. Thus, RS and WRS do not directly trigger the corresponding read or write activity in channel 50. In other words, RS and WRS do not indicate when data is ready to be accessed at the transducing head.

In more detail, due to the precision of the media write process for BPM, accessing sector fragments on the media via real-time Write Gate or Read Gate signaling from the formatter to the read channel is inadequate. Therefore, RS and WRS assertions will precede the corresponding sector fragment starting locations relative to the transducing head by a predetermined number of WRT CLK cycles, since the starting positions of the fragments on the media are determined by the data access information transferred across the FRAG INFO bus, not strictly by the location of the rising edge of RS or WRS.

Also, WRT_CLK is preferably generated from channel 50 NRZ_CLK. This allows the interface between channel 60 and formatter 50 to be isochronous.

To initially assert RS or WRS at the beginning of a data wedge, formatter 60 receives a signal generated relative to a servo address mark by the disc drive servo-related functionality on lead 65. The assertion of this "early servo gate" signal occurs around the deassertion of the servo gate signal minus the predetermined minimum number of WRT_CLK cycles described above. The early servo gate signal is as a reference point for formatter 60 to assert either RS or WRS before the beginning of each data wedge. And a symbol counter in the formatter starts to count the data wedge symbols in response to the early servo gate signal. The output of the counter is used to time any additional RS or WRS from the formatter for that data wedge. That timing takes into account the channel encoding and decoding time. Preferably RS and WRS are asserted 10 WRT_CLK cycles prior to the data on the media being accessible by the transducing head.

Figure 13:
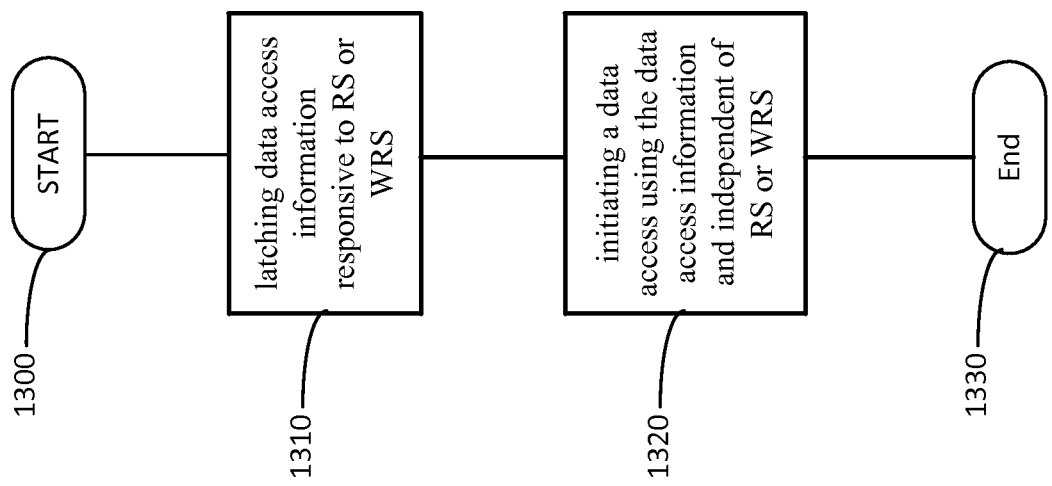
FIG. 13 illustrates a method for the use of RS and WRS.

FIG. 13 illustrates one method for the use of RS and WRS. After start step 1300, data access information is latched responsive to RS or WRS at step 1310. At step 1320 a data access is initiated using the data access information. However, the data access is initiated independent of the timing of RS or WRS.

For system-on-chip implementations, bus 70 is intended to be wide enough to transfer each fragment descriptor in one WRT_CLK cycle. However, other configurations with fewer signals and requiring multiple WRT_CLK cycles to transfer each fragment descriptor are also feasible, if they are supported both by formatter 60 and channel 50.

Figure 11:
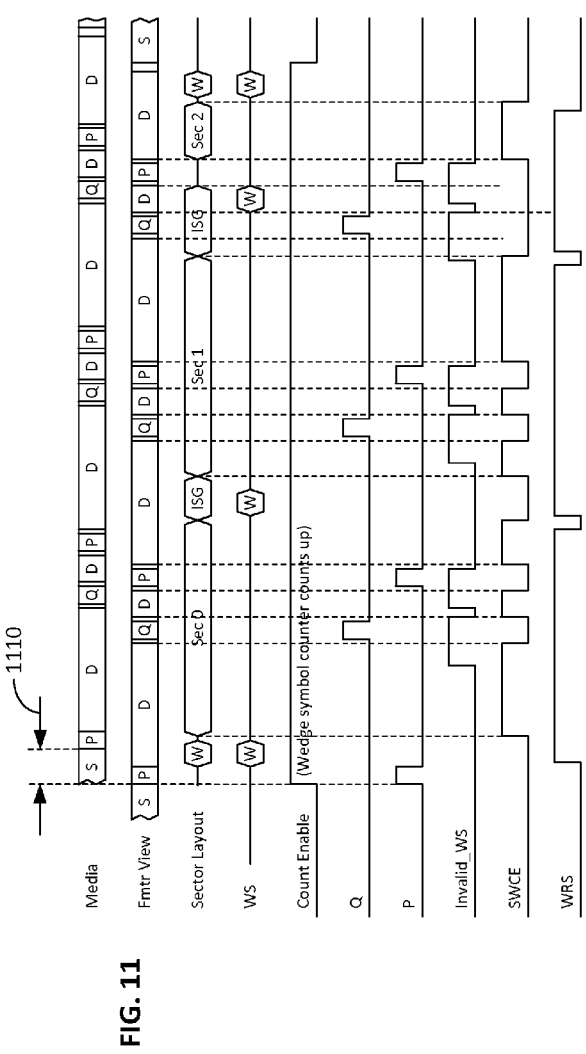
FIG. 11 is a timing diagram of an interface shown in FIG. 1b.

The timing diagram in FIG. 11 illustrates an example of a data wedge format with the corresponding WRS signal generated by the formatter. The track portion designated "media" represents the timing of the actual data under the transducing head. The track portion designated "Fmtr View" represents a spatial time shift of the "media" track portion that the formatter is generating. This formatter view of the data wedge precedes the actual media position at the write head, allowing the early transfer of the fragment descriptors to the channel. This is shown as timing interval 1110. The beginning of that interval relates to the early servo gate signal described above.

The "Sector Layout" represents how the formatter takes into account the data sectors and associated overhead layout in the data wedge. The WS (write splice) signal indicates where the formatter has determined each write splice is located in the format. The Invalid_WS signal indicates every symbol position in the data wedge at which a write splice is not allowed to begin, for protection of the Q and P fields. And as shown, the write splice length is short enough that it can fit in the runt data sector fragments between the Q and P fields, as shown in the intersector gap between sectors 1 and 2. The "Q" and "P" signals represent the placement of the Q and P fields as programmed in the formatter.

The signal SWCE (Sector Word Counter Enable) indicates when the formatter's data symbol counter counts encoded data symbols for a corresponding sector fragment. The wedge symbol counter, as represented by the Count Enable signal, counts up for the entire data wedge. This gives the formatter a precise representation of the length of the entire data wedge.

The three rising edges of WRS transfer the three fragment descriptors to channel 50. The WRS signal from the formatter is shown as approximately enveloping an entire sector fragment, including any Q or P fields that are contained within the fragment. This is optional, however, since all the information about a sector fragment is transferred to channel 50 on the rising edge of WRS. Though by making the WRS pulse widths approximate the sector fragment size on the media, the formatter can provide this signal to an externally accessible port as a useful diagnostic function. Also WRS is deasserted a small number of symbols before the end of the sector fragment to allow the formatter to prepare the next fragment descriptor (if not already done) and assert WRS for the next sector if the next sector is to be transferred.

Channel 50 maintains a symbol counter from the beginning of the data wedge starting immediately after the servo field. An additional benefit of using a symbol counter rather than a bit counter is that it will reduce the amount of additional high-speed digital logic in channel 50. The symbol counter can also be used to synchronize timing between the formatter and the channel. In write mode, while actively writing to the media, channel 50 automatically holds the write data to a predetermined (possibly programmable) DC level when the writer is over the Q fields or the P fields.

Specifically, channel 50 does not transition the write current (either by changing the write data or by turning the preamplifier on or off) while the reader is over a P field. Channel 50 does not cause the preamplifier to exit write mode if the writer is over a P or if the writer will be over a P field before the write splice time expires. This also supports preamplifiers that generate a high-frequency "degaussing" burst to the writer during the write current turn-off period.

The location and size of the Q fields in channel 50 are programmable. Instead of phase locked loop and sync fields, each sector will begin with a write splice field. Channel 50 is programmed with the size of this write splice field, which will potentially vary with recording zone, but will not vary on a given data track. Optionally, split sectors also include a write splice field before and after the servo field, if writing through servo fields cannot be supported (for example, due to the use of repeatable run-out fields or other data fields written into each servo field).

Channel 50 automatically writes a default (possibly 2T) pattern during the write splice field when writing to the media, and will automatically skip the write splice field when reading from the media. As described above, the BPM architecture will support preamble fields at the beginning of each contiguous run of sector data and postamble fields at the end of each contiguous run of sector data, to provide opening and closing sequences for the maximum-likelihood decoder in the channel. Channel 50 is programmed with the preamble field size and the postamble field size, which will not vary on a given data track.

For determining the fragment descriptors, formatter 60 calculates the data format for the upcoming data wedge. To do that, either the formatter has already calculated an immediately previous data wedge format and can use that to calculate the upcoming data wedge format. Or the formatter has to catch up to understand the previous data wedge format, particularly if a data sector was split across a servo wedge. This catch up can occur when the transducing head has moved tracks.

Figure 9:
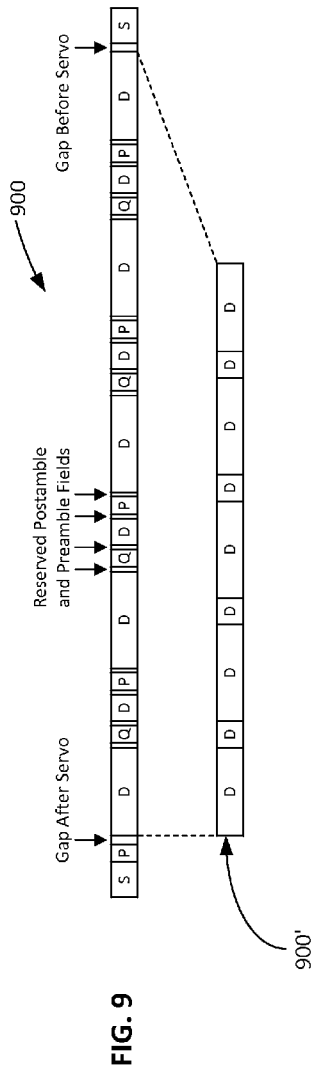
FIG. 9 illustrates data regions without certain overhead.

First, the formatter understands what servo wedge, actual or logical, it is over. Next the formatter determines if the first data sector fragment of the upcoming data wedge is part of a split data sector or begins a new data sector. This determination is done by the formatter using another model of the data wedge as a contiguous group of data sector fragments (with the Q and P fields removed, along with their reserved postamble and preamble fields) as shown in FIG. 9. A data format of data wedge 900 is shown between two servo wedges. Data wedge 900 includes data sector fragments D, Q and P fields, and preamble and postamble fields. However, for purposes of this determination, the formatter discards the Q and P fields along with the associated preamble and postamble fields (the transducing head overhead), and ignores the gaps before and after the servo wedges. In this way, the formatter only considers the data sector fragments shown as 900'. The data sector fragments in 900' are effectively concatenated data. Note that for this concatenated data model the data sector fragments include all write splices, ISGs, and the non-reserved preambles and postambles. The write splices, ISGs, and non-reserved preambles and postambles can be considered individually and collectively as fragment overhead. Non-overhead includes the actual data that can be considered as data symbols.

In addition, the formatter takes into account that the overhead—Q and P fields, ISGs, preambles, postambles, write splices, gaps before and after servo—within each data wedge of a track are constant, regardless of how data sectors are interrupted by Q and P fields. Every ISG field on the track is the same size. Every write splice field is the same size. Every Q field is assumed to have a postamble field immediately before it and a preamble field immediately after it. (Preamble and postamble fields may not be required around the Q fields; in this case, these preamble and postamble fields will be assumed to be zero-length.) Every P field is assumed to have a preamble field immediately after it, and every P field except the first one in each data wedge is assumed to have a postamble field immediately before it. If a gap after servo (GAS) field is required (for example, to contain repeatable timing run-out information), it occurs after the first P field of every data wedge. Given all that, the data sector fragments 900' have the same number of symbols for each data wedge of a track. That can extend to all or part of the tracks that make up a recording zone.

Using the fact that the data sector fragments 900' have the same number of symbols for each data wedge of a track, the formatter can quickly determine the upcoming data wedge's data format. For example, consider that a transducing head settled on a new track. The first servo wedge it encounters is servo wedge 2. With the formatter knowing that each data sector size is X and the data sector fragments 900' total size is Y, the formatter divides Y by X and then multiplies the result by the number of preceding data wedges (2 in this case). Any remainder starts the data sector fragment immediately after servo wedge 2. The formatter can then start generating the fragment descriptors knowing the lengths and locations of the overhead symbols and the symbol lengths of the data sector and data sector fragments 900'. All fragment descriptors for a data wedge can be determined at the same time and then queued.

If writing through the servo fields is supported by the disc drive, the formatter defines the capacity of a data wedge that begins with a new sector (e.g., "wedge 0" on the data track), since these types of data wedges will be slightly smaller in capacity compared to data wedges that begin with a split sector. This slightly reduced capacity of "wedge 0" type wedges is due to the fact that wedges that start with a new sector will begin with a write splice, whereas wedges that begin with a split sector will not begin with a write splice.

The data wedge model works well for the formatter to determine if the upcoming data wedge starts with a split data sector, but it can create a timing issue if the fragment descriptors are generated using only the same model without accounting for the locations and sizes of the Q and P fields. If the formatter did not consider the placement of the Q and P fields, the formatter would assert RS or WRS earlier and earlier for the next sector as it traversed the data wedge. Asserting WRS earlier than necessary for a target sector would increase the likelihood that channel 50 would not have encoded write data ready for the next sector just before WRS is asserted. This timing issue could put additional stress on the channel's data encoding pipeline, and it is considered undesirable.

This formatter model allows the quick calculation of the split configuration at the end of any data wedge, given the split configuration at the beginning of the data wedge. It also allows for the quick calculation of the impending data wedge format based on the actual or logical servo wedge zero. This model also allows for substantial use of different formatter configurations.

Figures 10A, 10B:
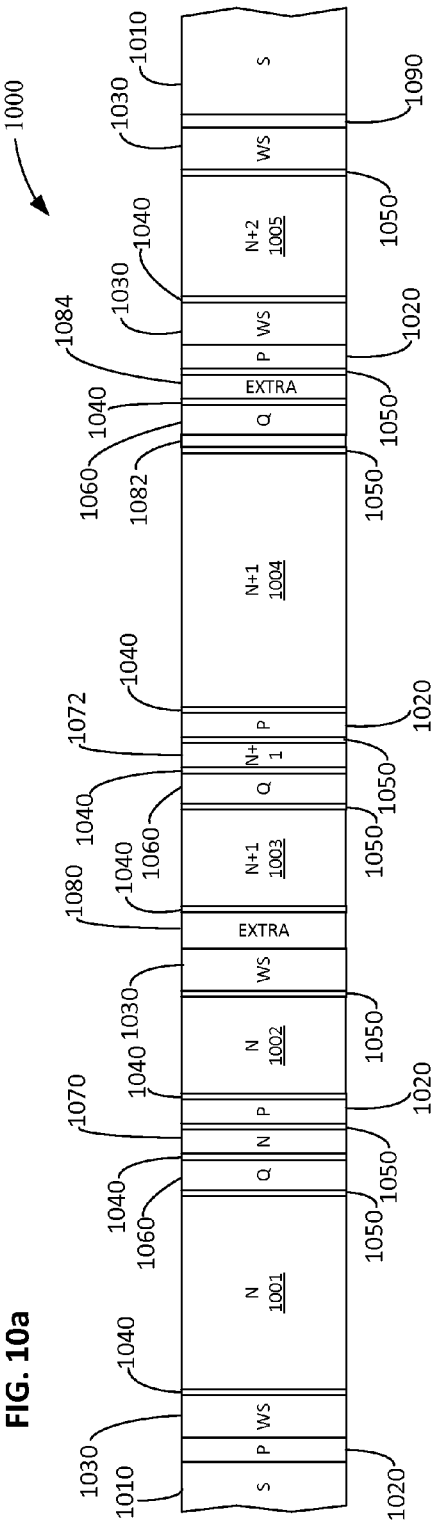
FIGS. 10a and b show a data wedge and corresponding fragment descriptors.

The determination of the fragment descriptors will be explained with reference to FIGS. 10a and 10b. FIG. 10 shows a data wedge 1000 between servo fields 1010. Data wedge includes 4-symbol P fields 1020, 7-symbol WS 1030, 1-symbol preambles 1040, 1-symbol postambles 1050, 5-symbol Q fields 1060, 4-symbol runt data sector fragments 1070 and 1072, 6-symbol extra symbols 1080, 2-symbol extra symbols 1082, 4-symbol extra symbols 1084, 1-symbol gap before servo 1090. Also included are data sector fragments 1001-05 that are respectively 32-, 16-, 16-, 42- and 20-symbols in length. The data format of data wedge 1000 is exemplary only, and as such is not limiting. So are the symbol lengths and positions of the fields. The symbol lengths for the WS, the runt data sector fragments, the Q and P fields, the preambles and postambles, and the gap before servo were predetermined and are available to the formatter. The extra symbols length can be calculated using the method steps shown in FIG. 8.

The table in FIG. 10*b* shows the fragment descriptors for data wedge 1000. Again note that for the fragment descriptors, the term "sector fragment" is different from the term "data sector fragment" used to this point. A "sector fragment" can include multiple "data sector fragments" as will be seen referring to this table. The first entry in the table is for fragment descriptor N. The Sector Fragment Start Write Splice for this sector fragment is at symbol 4 (the first symbol in the P field 1020 is symbol 0). The Sector Fragment End Write Splice is at symbol 78. Thus, "data sector fragments" 1001, 1002 and runt data sector fragment 1070 are included in "sector fragment" N. The Sector Fragment Start is the symbol location for the preamble of data sector fragment 1001, which is preamble 1040 at symbol 11. The Sector Fragment length is the sum of data sector fragments 1001, 102 and runt data sector fragment 1070, which is 52 symbols. The Sector Fragment Number is shown as 2, meaning there are Sector Fragment Numbers 0 and 1 in a previous wedge. End of Sector Flag is set to 1 to signify that Sector Fragment Number 2 is the last sector fragment in the associated data sector. Similar determinations are made for Fragment Descriptors N+1 and N+2.

The defined architecture allows for format-efficient data storage on bit-patterned media, while allowing for typical variations in the drive, such as reader-writer gap variations. The defined BPM architecture relaxes some timing requirements on real-time signaling from the formatter to the channel, while enabling bit-accurate alignment between data accesses and the media.

The description above is applicable for systems in which the channel and the formatter are integrated as parts of the same "system on chip", or SoC. Therefore, separate read and write data buses have been used instead of a bidirectional bus with bidirectional control signals. However, there may be circumstances where a discrete, external formatter may be used to interface to an external channel. The read and write data buses can then be combined into a single bidirectional bus to reduce overall pin count.

The detailed description is illustrative only and is intended not to limit this disclosure. Variations and modifications are possible. For example, the functionality can be performed by hardware alone, or hardware under firmware control. Either or both of the FRAG_NUM and the END_OF_SCTR can be removed from the fragment descriptor. Any of the fields do not have to be symbol aligned. The units on the interface would then be defined as something other than symbols. Bits instead of symbols can be used. Although the length of the Q field is determined by the length of the P field as described to be as short as possible to satisfy the timing recovery requirements, the Q field can be the same size as the P field depending on the resolution the interface uses. The Q field can also be greater than or equal to the length of the P field, constrained by any physical limitations of format efficiencies taken into account.

The runt data region space can be eliminated so that the entire reader-writer gap can be just Q and P fields. The Q field could run into the P field, leaving no usable media between them. However, this situation would represent a significant format efficiency loss, which is less desirable. The write splice can be any size. The interface protocol supports a wide range of write splice lengths. Smaller is better for format efficiency. The preambles and postambles can be any size. The interface protocol can support preambles and postambles longer than one symbol. The formatter implementation is simplified by assuming they can be no longer than one symbol. The preamble and/or postamble can be eliminated from the ISG. However, induced bit errors may occur. The ISG does not have to include extra symbols. Including extra symbols in the ISG helps to keep the formatter logic less complex. A symbol can be anything less than a sector in size. The symbol width is chosen to be a practical unit of data transfer and timing management for both the read channel and the formatter.

Figure 12:
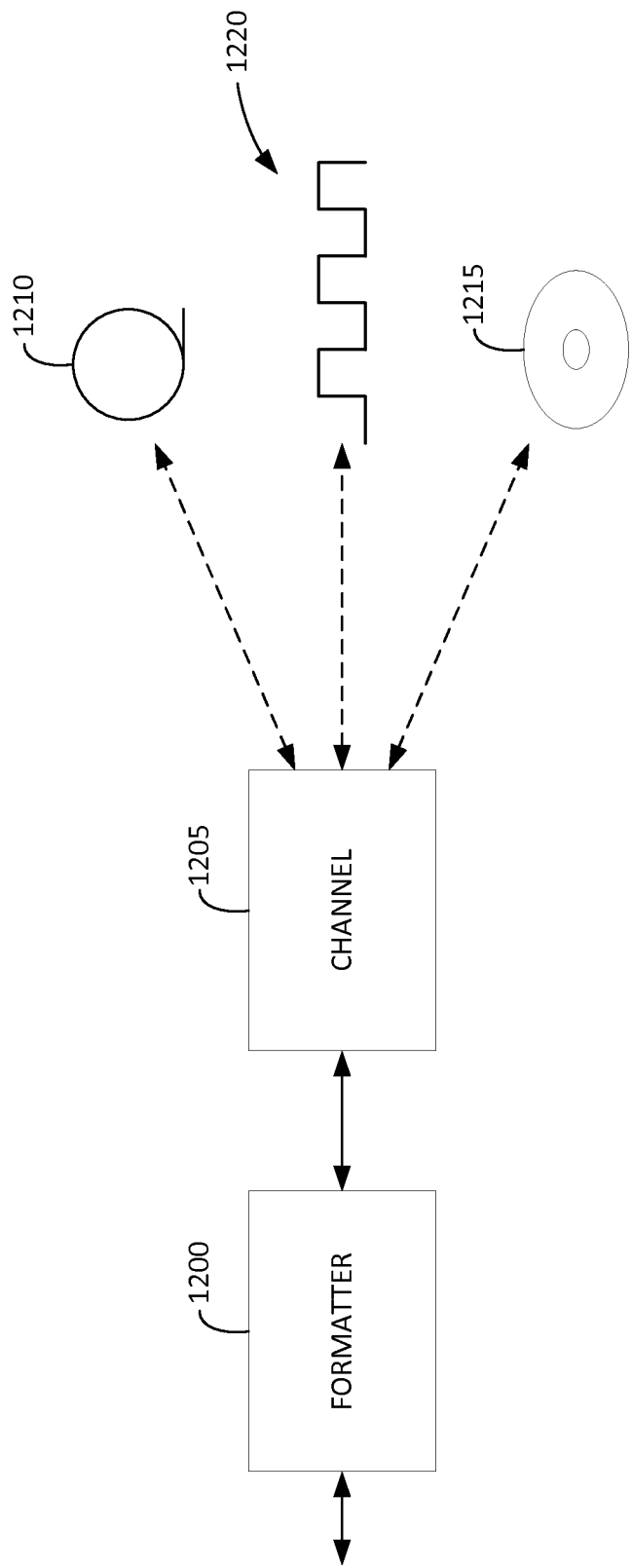
FIG. 12 discloses a formatter and a channel coupled to one of a tape, optical, and data stream.

The interface described could be used with other types of media, such as non-bit-patterned media, heat assisted magnetic recording media, tape and optical. The interface described can be used for a digital data stream coupled to the channel. To illustrate, FIG. 12 shows a formatter 1200 and channel 1205 coupled to one of a tape 1210, optical 1215 and data stream 1220.

The described apparatus and methods should not be limited to the particular examples described above. Various modifications, equivalent processes, as well as numerous structures to which the described apparatus and methods may be applicable will be readily apparent.

What is claimed is:

1. A formatter configured to generate:
   a first output to a read channel to provide data access information; and
   a second output to the read channel to indicate the data access information is ready for transfer, the second output is timed independent of initiating a data access.

2. The formatter of claim 1 wherein the data access information includes at least one fragment descriptor.

3. The formatter of claim 1 wherein the second output is provided a predetermined time before associated data is available.

4. The formatter of claim 3 wherein the second output is generated responsive to an early servo gate signal.

5. The formatter of claim 1, wherein the formatter is further configured to generate a third output to provide formatted data.

6. The formatter of claim 5, wherein the formatter is further configured to generate a fourth output to provide a clock signal.

7. The formatter of claim 1, wherein the formatter is further configured to receive formatted data.

8. The formatter of claim 7 wherein the formatter is further configured to receive a clock signal.

9. The formatter of claim 1 wherein the formatter is further configured to use a concatenated data model to generate a data wedge format, and to use the data wedge format to generate the data access information.

10. The formatter of claim 1 wherein the data access information includes at least one of a sector fragment starting write splice value, a sector fragment ending write splice value, a sector fragment start value, a sector fragment length value, a sector fragment number and an end of sector flag.

11. A device comprising:
    a formatter that outputs an information packet for a data access operation and a signal that indicates the information packet is ready; and
    a read channel coupled to receive the information packet and the signal, the read channel initiates the data access operation independent of the signal.

12. The device of claim 11 wherein the formatter and read channel operate isochronously.

13. The device of claim 11 wherein the formatter receives an early servo gate signal.

14. The device of claim 11 wherein the gate signal is not used to initiate a data access.

15. The device of claim 11 wherein the read channel provides a first clock signal to the formatter.

16. The device of claim 15 wherein the formatter provides a second clock signal to the read channel that is responsive to the first clock signal.

17. The device of claim 11 further comprising a bit-patterned medium in communication with the read channel, the bit-patterned medium configured to have at least one zone including a plurality of tracks, at least some of the plurality of tracks have transducing head overhead and concatenated data that are the same size, respectively.

18. The device of claim 17 wherein the formatter generates a data wedge layout using the same size transducing head overhead and concatenated data, and generates the information packet using the data wedge layout.

19. The device of claim 11 further comprising a medium that includes data wedges, each data wedge has same amounts of data symbols and overhead.

20. The device of claim 11 wherein the information packet includes at least one of a sector fragment starting write splice value, a sector fragment ending write splice value, a sector fragment start value, a sector fragment length value, a sector fragment number and an end of sector flag.

21. A data formatting method comprising:
outputting at least one fragment descriptor to a read channel for a data access; and
outputting a signal to the read channel that indicates the at least one fragment descriptor is available and that is timed independent of a start of the data access.

22. The method of claim 21 wherein the at least one fragment descriptor sector includes fragment information.

23. The formatter of claim 1 wherein the formatter is a bit patterned media (BPM) formatter.

24. The method of claim 21 wherein the at least one fragment descriptor includes at least one of a sector fragment starting write splice value, a sector fragment ending write splice value, a sector fragment start value, a sector fragment length value, a sector fragment number and an end of sector flag.

25. The method of claim 21 wherein the signal is generated responsive to an early servo gate signal.

* * * * *